2 Sheets—Sheet 1.

O. HEIKEL.
MAGNETO ELECTRIC MACHINES.

No. 184,377. Patented Nov. 14, 1876.

Witnesses
Chas. H. Smith
Geo. T. Pinckney

Inventor
Otto Heikel
per L. W. Serrell
Atty.

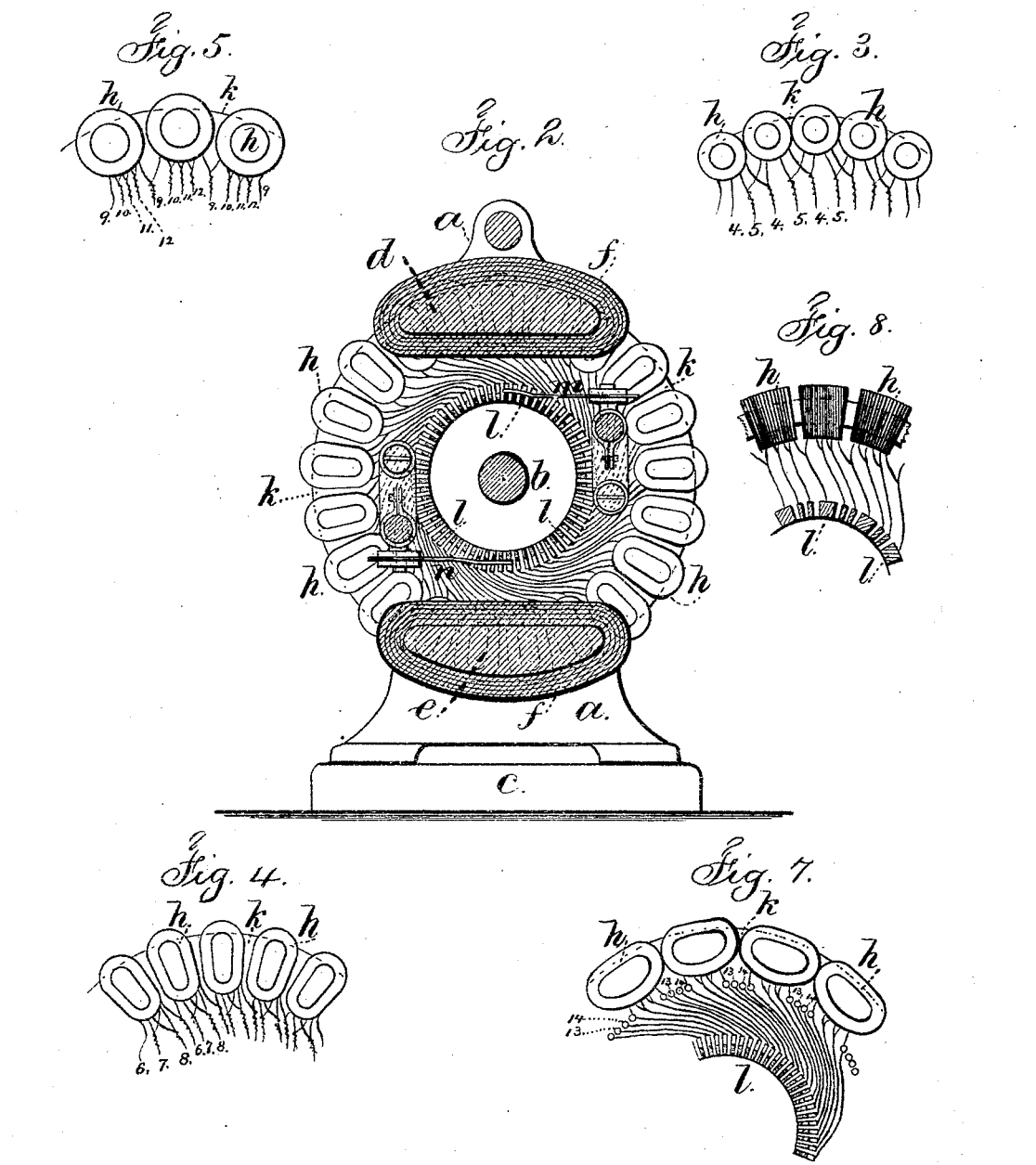

UNITED STATES PATENT OFFICE.

OTTO HEIKEL, OF JERSEY CITY, NEW JERSEY.

IMPROVEMENT IN MAGNETO-ELECTRIC MACHINES.

Specification forming part of Letters Patent No. 184,377, dated November 14, 1876; application filed September 8, 1876.

*To all whom it may concern:*

Be it known that I, OTTO HEIKEL, of Jersey City, in the county of Hudson and State of New Jersey, have invented an Improvement in Magneto-Electric Machines, of which the following is a specification:

This invention relates to a machine driven by mechanical power, in which a circular armature of cores is revolved adjacent to stationary magnets, and in so doing a secondary current is set up in the helices surrounding the cores, and this current is taken away continuously through a commutator, and employed to intensify the magnetism of the stationary magnet, or for telegraphic purposes, or for plating, or electric lights, or for any other operation where electricity is employed.

A machine of this character is shown in Letters Patent No. 168,018, granted to me September 21, 1875, and the present invention is an improvement upon the same.

Difficulty has heretofore existed in many of these magneto-electric machines, in consequence of the heat developed from the sparks, and from the differences of resistance to the electric circuit, producing pulsations in the entire circuit.

My improvement is made with reference to a subdivision of the helices or coils of the armature-cores in such a manner as to render the resistance to the induced current more uniform than heretofore, and obtain both intensity and volume of the electric current and great uniformity in the flow of the same without the development of the intense heat at the commutator heretofore produced, and thus prevent injury to the contact-points.

Figure 1:
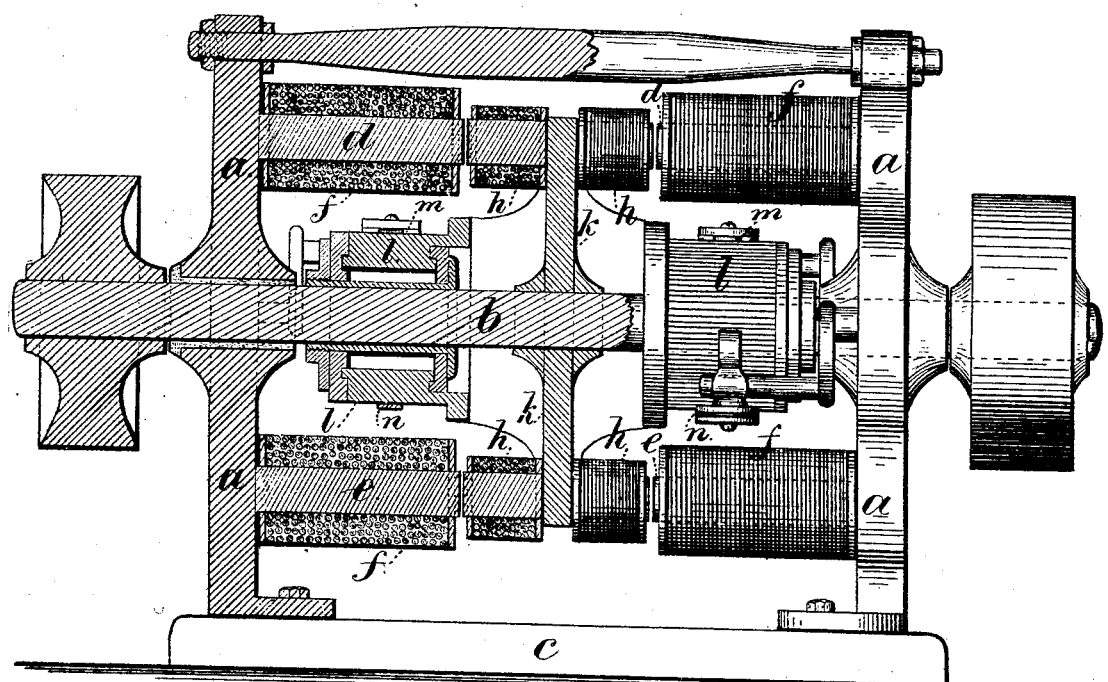
Figure 6:
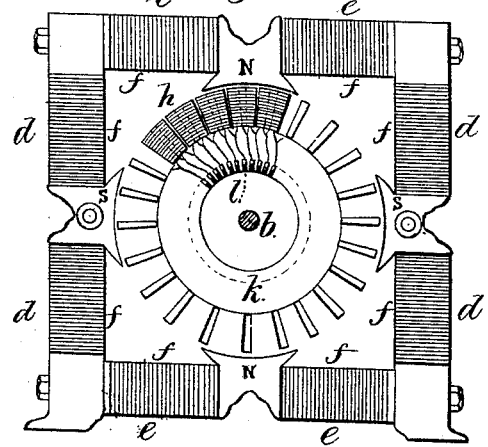

In the drawing, Figure 1 is a side elevation of the machine, partially in section. Fig. 2 is an elevation of the revolving armature of cores and helices, and a section of the commutator. Figs. 3, 4, and 5 represent face views of portions of the cores, for illustrating the manner of winding the helices; and Fig. 6 is an elevation of a double magnet, with the revolving armatures and helices wound, as aforesaid.

The frame $a\ c$ sustains the shaft $b$, that is revolved by competent power. The portions $a$ of the frame form the connecting-bars for the cores $d\ e$ of the magnets, which are preferably made with surrounding helices $f$ to form electro-magnets; and I remark that these helices may be in a circuit from a battery or other source of electricity, but preferably in a circuit from the helices of the armatures, so that the power of the electro-magnets $d\ e$ will be intensified to their maximum capacity by the induced current from the revolving cores and helices. The cores of these permanent magnets are elliptical or widened in the direction in which the armature-cores revolve, so that such cores remain longer in the field of the magnetic influences, and the resulting current is increased. The circular ranges $h$ of cores upon the disk $k$ form armatures to the magnets $d\ e$. I remark that there may be only one magnet $d\ e$; but I have shown two that face each other at opposite sides of the disk $k$, as in Fig. 1, or at opposite edges, as in Fig. 6, where the armature-cores are represented as placed radially around the edge of the disk. By placing the revolving shaft that carries the armature-cores within the stationary electro-magnet, I obtain the space necessary to introduce the commutator upon such shaft and within the stationary magnet.

In the magneto-electric machines, such as that patented by me, as aforesaid, the direction in which the current flows in each armature-helix is changed as it passes each commutator-spring. Hence the current pulsates in consequence of the varying resistance, and the change of direction of the current, and these tend to increase the spark at the commutator.

I divide up the helices of each armature-core into sections, and increase the number of commutator-points, so that the change of direction in the current passing through the helices will be made more in detail, so as to render the flow of electricity more uniform, and lessen the spark produced at the commutator.

The commutator is made of the bars $l$, that are insulated in heads upon the shaft $b$, and there is a spring or brushes, $m$, above the circular range of commutator-bars, and another spring, $n$, below the same, and the commutator-bars are a multiple of the armature-cores, so that there are two, three, or more such commutator-bars to each armature-core, and I divide up the armature-helices into the same number of sections, and connect each section to the next and to the commutator-bars.

The helices of the armature-cores are wound into sections. For instance, I can wind one-quarter of the length of each core with one wire, and carry the wire out as a loop to one of the commutator-bars, and then wind the next section on the same core, and take out a loop to the next commutator-bar, and so on until all the sections of one core are wound, and then I wind the first section on the next core, and thus proceed with all the cores, so that the four commutator-bars to each core will be connected in succession to the sectional helices, and the helices will also be connected together.

Another mode of winding is to wind one layer of wire the length of the core, and then a second layer back again, then take off a loop of wire to one of the commutator-bars, and then proceed to wind a third and a fourth layer and connect to the commutator-bar to make the required number of sections to each helix until all the armature-helices are wound.

The same effect will be obtained if there are two or more separate wires on each core wound to form the helices, and connected to the respective commutator-bars, so as to form two or more circuits running through the helices of the armature-cores, and connected, as aforesaid, to the commutator. There may be two, three, four, or more sectional helices to each core, there being a corresponding number of commutator-bars.

In Fig. 3 of the drawing there are two connections, 4 and 5, to each core, the helix being in two sections and wound, as aforesaid. In Fig. 4 there are three connections, 6, 7, 8, to each core, and in Fig. 5 there are four such connections, marked 9, 10, 11, 12. In Fig. 7 there are shown three commutator-bars to each helix, and it is to be understood that the wires 13 and 14 are brought through the disk from sectional helices of the cores on the other side of the disk. In that case all currents from the helices are brought to one set of commutator-bars; but one or more sections of the helices on one side can be taken off by the commutator $l$ forming another circuit that may go through the helices of the permanent magnets to intensify the same to the maximum capacity.

In this manner two separate induced circuits can be taken away from the respective commutators, and if the commutators were increased in number, there might be as many secondary circuits as there are sections to the cores.

The cores of the revolving armature may be circular or elliptical, and if they are elliptical, it is preferable to place them so that the longest diameters will be radial.

The cores may be placed in a circle, as illustrated in Fig. 8, with the sectional helices around them, and it will generally be preferable to make the commutator-bar wider, which is in the circuit between the helix of one core and the helix of the next core, as seen in Fig. 8.

It will now be understood that the armature-cores are magnetized during the time that they are in the field of influence of the broad stationary magnets, and that the current set up in the helices is taken off in detail as the sections are successively connected with the commutator, and by the arrangement shown, a very powerful and uniform current is obtained in proportion to the mechanical force exerted to rotate the armature-shaft.

I claim as my invention—

1. In a magneto-electric machine, containing a range of revolving armature-cores, a series of sectional helices to such cores and connections between such sectional helices and the commutators, substantially as set forth.

2. The combination of a circular range of armature-cores, two or more helix-sections on each core, and a range of commutator-bars equal in number to the the helix-sections, and a disk and revolving shaft, substantially as and for the purposes set forth.

3. In a magneto-electric machine the stationary magnets $d\ e$, having elliptical poles and corresponding surrounding helices, elongated in the direction in which the armature-cores revolve, for the purposes and as set forth.

Signed by me this 5th day of September, 1876.

OTTO HEIKEL.

Witnesses:
GEO. T. PINCKNEY,
CHAS. H. SMITH.